United States Patent [19]

Barta

[11] Patent Number: 4,497,834

[45] Date of Patent: Feb. 5, 1985

[54] METHOD OF MAKING A DAIRY-BASED FOOD PRODUCT

[76] Inventor: Frank E. Barta, 2307 Fillmore St. Northeast, Minneapolis, Minn. 55418

[21] Appl. No.: 412,762

[22] Filed: Aug. 30, 1982

[51] Int. Cl.³ ............................ A23C 9/12; A23C 20/00
[52] U.S. Cl. ..................................... 426/42; 426/580; 426/582; 426/573
[58] Field of Search ................. 426/34, 36, 40, 41, 426/42, 37, 582, 583, 587, 613, 580, 573; 435/99, 105

[56] References Cited

U.S. PATENT DOCUMENTS

| | | |
|---|---|---|
| 2,501,445 | 7/1946 | Hoecker et al. .................... 426/587 |
| 2,681,858 | 11/1950 | Stimpson ............................ 435/105 |
| 3,899,596 | 8/1975 | Stenne . |
| 3,914,435 | 10/1975 | Maubois et al. . |
| 3,963,837 | 6/1976 | Maubois et al. . |
| 3,988,481 | 10/1976 | Coulter et al. ....................... 426/40 |
| 3,991,667 | 11/1976 | Stenne . |

OTHER PUBLICATIONS

Winton et al., Structure and Composition of Foods, John Wiley & Sons, Inc., 1937, p. 135.

Primary Examiner—Robert Yoncoskie
Assistant Examiner—Marianne S. Minnick
Attorney, Agent, or Firm—Burd, Bartz & Gutenkauf

[57] ABSTRACT

A greatly simplified method of making a nutritious dairy-based food product. According to the present process, milk is first condensed to the proportion of milk solids and moisture corresponding substantially to that desired in the final product. The concentration of lactose in the milk is reduced by one of several methods to below about 15 percent by weight at which crystallization occurs. The mixture is gelled by heating and thereafter may be cooled, manipulated and packaged in the usual manner. Since no whey is produced, no whey drainage is necessary and the whey protein, lactose, and other soluble minerals usually separated and discarded remain in the final product.

14 Claims, No Drawings

METHOD OF MAKING A DAIRY-BASED FOOD PRODUCT

FIELD OF THE INVENTION

Background of the Invention

This invention is directed to a simplified method of making a dairy-based food product. In some forms the food resembles process cheese or a process cheese spread such as is used for making sandwiches, canapes, stuffing for celery and olives, cheese sauces, dips, and the like. Although not limited to production of cheese food products, the invention include a method by which a process cheese food product may be made directly from milk without the necessity of first preparing a base natural cheese in the usual manner as a starting material for manufacture of process cheese, and without the production of whey, and resulting loss of nutritive milk components. References to cheese are illustrative purposes.

The conventional process cheese is made by a batch process. It is long and time consuming from the initial preparation of the natural base cheese to the finished process cheese product. In the past, most whey are simply discarded by draining to the sewer where it contributed to water pollution. Now, because of concern for the environment, ecologically compatible disposal of whey presents a problem to the cheese maker. At the same time, the nutritive values of the whey are lost. One of the objects of the present invention is to provide a method for the production of a cheese food product or dairy-based noncheese food product without syneresis and the resulting loss of whey and whey solids.

The Prior Art

The prior art is replete with processes for producing cheese food products without syneresis as a means of increasing yields by retention of whey solids. One objectionable result of whey retention is a graininess due to crystallization of milk sugar or lactose which otherwise is separated with the whey. Coulter et al U.S. Pat. No. 3,988,481 discloses a method of preparing cheese from milk which has been delactosed by molecular sieving. Maubois et al U.S. Pat. Nos. 3,914,435 and 3,963,837 and Stenne U.S. Pat. Nos. 3,899,596 and 3,991,667 disclose processes in which milk is subjected to ultra filtration to remove lactose, along with mineral salts and other low molecular weight constituents of milk.

SUMMARY OF THE INVENTION

According to the present invention, milk is first condensed to the approximate proportion of total solids and moisture corresponding substantially to that desired in the final product. To prevent graininess in the final product, the concentration of lactose is reduced to below the level at which crystallization occurs by one of three methods. (1) The milk is at least partially delactosed by treatment with the enzyme lactase. The lactose in the milk is hydrolyzed enzymatically into the more soluble sugars glucose and galactose. (2) The concentration of lactose is reduced by ultra-filtration or molecular sieving. (3) The concentration of lactose is reduced by dilution with an additive food, such as honey, peanut butter, ground meat, or the like. Various flavoring and other additives may be incorporated. The mixture is gelled by heating and thereafter may be cooled, manipulated and packaged in the usual manner. Since no whey is produced, no whey drainage is necessary and the whey protein and soluble minerals usually separated and discarded remain in the final product.

DETAILED DESCRIPTION OF THE PREFERRED EMBODIMENT

The method of the present invention is simple, direct and rapid. Since the material being processed is liquid throughout, until formation of the final product, it lends itself readily to continuous processing. In its broadest terms, the process of the present invention comprises the steps of condensing milk, either whole milk or skim, to the proportions of milk solids and moisture corresponding substantially to that of the desired final product. Alternatively, dry milk may be reconstituted to produce the same type of starting material. Non-fat milk solids may comprise about 15 to 50 percent by weight of the final product, the amount depending upon whether that product contains fat. In fat-containing cheese food products, non-fat milk solids usually comprise about 20 to 33 percent, and typically about 30 percent by weight. Moisture is usually present in amount about 35 percent to 55 percent and typically about 40 percent for process cheese and about 50 percent for process cheese spread. For cheese food dips the moisture content may be higher, up to about 60 to 65 percent.

Lactase is added to enzymatically hydrolyze the lactose in the milk in whole or in substantial part. The lactase is added in amount between about 0.001 to 0.30 parts by weight per 100 parts of condensed milk. The lactase is added and thoroughly admixed at a temperature ranging between about 32° F. and 165° F. The lactase treatment may be carried out either before or after concentration to remove unwanted water.

Alternatively the lactose concentration in the milk may be lowered to below about 15 percent by weight, at which level the lactose begins to crystallize, by separating and removing at least part of the lactose. This separation and removal may be accomplished by means of conventional techniques, such as molecular sieving as taught by Coulter et al, or ultra-filtration as taught by Maubois et al and Stenne. The separation and removal treatment may be carried out either before or after concentration of the milk to remove unwanted water.

Instead of reducing the lactose concentration by partial or complete hydrolysis, or by partial or complete removal, the concentration may be reduced to below the level at which crystallization occurs by diluting the milk after desired concentration with a semi-solid nutritive flavor enhancing or characterizing additive food. The additive food is added in amount at least about 15 percent and up to 50 percent by weight sufficient to dilute the concentration of lactose below about 15 percent by weight. Exemplary additive foods include chopped and pureed fruits and vegetables, chopped and pureed meats, honey, peanut butter, jam, jellies, and the like.

Where a fat-containing final product is desired, then fat is added to bring the fat content to the proportion desired in the finished product, between about 5 to 40 percent and typically about 10 to 30 percent. The moisture is adjusted if necessary to the desired range.

The desired pH range is between about 4.5 to 7.0 and preferably about 5.3 to 5.8. A small amount of FDA approved food acidulent, such as lactic, citric, acetic or phosphoric acid, may be added as necessary to achieve the desired pH.

The mixture is heated gradually to about 150° to 300° F., desirably about 160° to 180° F. and preferably to about 175° F. A higher temperature, preferably in the range between about 270° to 290° F., is used to produce a sterile or aseptic product suitable for long term storage without refrigeration. Heating is continued until the thickened mixture has achieved the desired consistency, usually about 2 to 5 minutes. Typically continued heating after the mixture has reached 175° F. is unnecessary, but heating may be continued for as long as 45 minutes to produce a thicker product. The mixture is desirably agitated and blended in order to produce a smooth homogeneous product.

A small amount of emulsifier is desirably added in fat-containing mixtures to provide uniform distribution of fat and to insure against fat separation. Similarly, a small amount of stabilizer is desirably added in order to maintain uniform distribution of moisture and insure against separation of moisture. Typical standard dairy emulsifiers approved for food use include monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate, and mixtures thereof. Standard stabilizers include algins and algin derivatives including sodium derivatives of algin and propylene glycol derivatives of algin, pectins, corn oil lecithin, blends of vegetable colloids and hydrophilic esters, modified stearates, carob bean gum, gum karaya, gum tragacanth, guar gum, carrageenan, oat gum, xanthan gum, sodium carboxymethyl cellulose, and the like, and mixtures thereof. The emulsifier and/or stabilizer are added in small amount up to about 0.1 to 6 percent by weight.

The final product may be extruded and packaged using available conventional extrusion and packaging equipment.

Milk with a fat content varying from that of skim milk to cream, or analogous reconstituted dried milks, may be used as the starting material. The milk is condensed by evaporation using conventional dairy evaporation equipment. When fat is used, it may be butter fat or butter oil or plastic cream, or it may be a non-dairy vegetable fat such as corn oil, cottonseed oil, peanut oil, sunflower seed oil, soybean oil, and the like, either singly or in combination.

Although the dairy-based food product sets up and gels solely as a result of heating, in some instances it is desirable to include a minor amount of a coagulant such as rennet or similar curd forming agents to facilitate gelling of the mixture and to enhance its flavor. Rennet is ordinarily added in cold water solution and mixed thoroughly. Rennet action ordinarily occurs between about 80° and 105° F. Similarly, a standard dairy starter or inoculate may also be included in minor amount to enhance the cheese flavor. Salt may be included in amount up to about 4 percent. Coloring may be added when desired. For various specialty food products, flavor characterizing materials such as vegetables, fruits, spices, herbs, meats, honey, jams, pepper, caraway seeds, chopped pimento, chopped bacon, chopped onion, chives, leeks, peanut butter, etc., and the like, may be added.

Dairy food product should be of semi-soft consistency. It should be capable of being sliced and retain its form. After packaging, the food product is cooled. The high temperature attained in cooking, together with the heat retained during the several hours required to cool the product, makes the product microbiologically stable. It keeps well and does not ripen further.

Because no whey is produced in the process of this invention, no disposal problem is present. Instead, the hydrolyzed lactose, minerals and protein ordinarily discarded with the whey remain in the food product to enhance its nutrient values.

The invention is illustrated by the following examples:

EXAMPLE 1

To 93.935 parts by weight of condensed whole milk of 50 percent total solids there was added 0.09 parts of lactase derived from yeast (Pfizer Co.). The mixture was held at 100° F. for 45 minutes. Then there was added 0.6 parts fumaric acid, 0.6 parts salt, 1.8 parts cheese flavor paste (Dairyland Food Labs) and 0.025 parts rennet extract (Marschall Labs microbial rennet substitute) diluted in 0.5 parts cool water. After 10 minutes at 100° F. the mixture was heated to 175° F. over a period of 20 minutes. During heating, 2.30 parts sodium citrate and 0.35 parts sodium hexametaphosphate were added with continued thorough mixing. The mixture was held for 5 minutes at 180° F. At this time the mixture was a viscous plastic fluid. The mixture was then dispensed in plastic containers with tight fitting lids and allowed to cool.

At 40° F. the product had a smooth, moderately spreadable texture yet was firm enough to retain its shape without supporting container walls, with a taste similar to a mild pasteurized process cheese product. At room temperature the product was readily spreadable and tended to slump when not supported by container walls.

EXAMPLE 2

The method of Example 1 was repeated except the starting material was comprised of 86 parts condensed skim milk at 42 percent total solids and 14 parts anhydrous milk fat. A similar product resulted.

EXAMPLE 3

The method of Example 1 was again repeated except the starting material was comprised of 86 parts condensed skim milk at 42 percent total solids and 14 parts partially hydrogenated vegetable fat (Durkee Kaola D). Again, a similar product was produced.

EXAMPLE 4

A starting material comprised of 71.4 parts condensed skim milk at 42 percent solids, 6.00 parts soy protein isolate (Grain Processing Corp.), 8.57 parts water and 14 parts partially hydrogenated vegetable fat (Durkee Kaola D) was treated with lactase as in Example 1 and the process of that example was repeated with similar results.

EXAMPLE 5

Pasteurized fresh whole milk was treated with lactase preparation to reduce the lactose content in the milk to one half its original level. This milk was subsequently condensed to 50 percent total solids and used as starting material for the process as in Example 1.

EXAMPLE 6

A more stable product was prepared according to the method of Example 1 except that 0.5 part carboxymethylcellulose (Hercules 7M 85F) was added concurrently with the sodium citrate. This resulted in a product which when cooled was sliceable and retained its shape without support at room temperature while retaining moderate spreadability.

EXAMPLE 7

Pasteurized fresh whole milk was treated by ultra-filtration until one half the lactose was removed, then concentrated by vacuum evaporation to 50 percent total solids and used as the starting material for the process as in Example 1.

EXAMPLE 8

Pasteurized skim milk was treated by passing through a bed of Sephadex (TM) to remove half the lactose, then concentrated by vacuum evaporation to 42 percent solids. Then 86 parts of this lactose reduced material and 14 parts anhydrous milk fat were mixed and used as the starting material for the process as in Example 1.

EXAMPLE 9

Whole milk was condensed to 33 percent total solids by vacuum evaporation. Then 3 parts of condensed milk and 1 part smooth peanut butter were mixed and heated to 160° F. With thorough mixing the product was dispensed into containers and cooled.

EXAMPLE 10

Whole milk is condensed to 40 percent total solids. Then 3 parts of condensed whole milk and 1 part honey are mixed and heated to 160° F. with continued mixing. The mixture is dispensed into containers and cooled.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A method of making a dairy-based food product which method comprises:
   (A) condensing fatted or defatted milk to produce a mixture having substantially the proportion of milk solids and moisture desired in the final food product and reducing the concentration of lactose to below about 15 percent by weight at which crystallization occurs by hydrolysis or by ultra-filtration or molecular sieving,
   (B) cooking the condensed milk of a sufficient solids level and heating at a temperature and for a time effective to produce a gel-like consistency,
   (C) agitating and blending the cooked milk mixture into a uniform homogeneous mass, and
   (D) packaging the resulting product and cooling.

2. A method according to claim 1 wherein the concentration of lactose is reduced by adding lactase to the milk in amount sufficient to hydrolyze the lactose in the milk in at least substantial part.

3. A method according to claim 2 wherein the milk is condensed prior to addition of lactase.

4. A method according to claim 2 wherein lactase is added prior to condensation of the milk.

5. A method according to claim 2 wherein lactase is added in amount between about 0.001 and 0.30 parts per 100 parts of milk.

6. A method according to claim 1 wherein the concentration of lactose is reduced by subjecting the milk to ultrafiltration or molecular sieving.

7. A method according to claim 1 wherein the mixture is heated to about 150° F. to 300° F.

8. A method according to claim 7 wherein the mixture is held at the attained temperature for not more than about 45 minutes.

9. A method according to claim 1 wherein said milk is selected from the class consisting of milk having fat content ranging from that of skim milk to cream and analogous reconstituted dried milk products having fat content ranging from that of skim milk to cream.

10. A method according to claim 1 wherein fat is added to the condensed milk in amount to produce a mixture having substantially the proportion of fat, non-fat milk solids and moisture desired in the final product.

11. A method according to claim 10 wherein the ingredients are present in the proportion of about 10 to 30 percent moisture.

12. A method according to claim 1 wherein a small but effective amount of a curd-forming agent is admixed in said mixture.

13. A method according to claim 1 wherein about 0 to 4 percent salt and up to about 0 to 6 percent of a material from the class consisting of standard dairy emulsifiers and standard dairy stabilizers are admixed in said mixture.

14. A method according to claim 1 wherein flavor characterizing ingredients selected from the class consisting of vegetables, fruits, spices, herbs, meats, honey, jams, pepper, caraway seeds, pimento, bacon, onion, chives and peanut butter are admixed in said mixture.

* * * * *

UNITED STATES PATENT AND TRADEMARK OFFICE
CERTIFICATE OF CORRECTION

PATENT NO. : 4,497,834
DATED : February 5, 1985
INVENTOR(S) : Frank E. Barta

It is certified that error appears in the above-identified patent and that said Letters Patent is hereby corrected as shown below:

Column 1, line 24, "are" should be --was--.

Column 6, claim 11, line 3, after "per cent", --fat, 30 per cent non-fat milk solids and 40 to 50 per cent-- is omitted.

Signed and Sealed this

Ninth Day of July 1985

[SEAL]

Attest:

DONALD J. QUIGG

Attesting Officer    Acting Commissioner of Patents and Trademarks